UNITED STATES PATENT OFFICE 2,357,725

FLAMEPROOFING

Harry Bennett, Woodmere, N. Y.

No Drawing. Application October 9, 1941,
Serial No. 414,297

6 Claims. (Cl. 260—32)

This invention relates to flameproofing and particularly to a composition adapted to make textiles or the like practically incombustible and to remain so after repeated laundering or exposure to rain.

There has long been need of a flameproofing composition that may be applied easily and economically to textiles, paper, leather, wood or the like, that is sufficiently fluid to penetrate the pores of such materials, and that remains firmly attached to the treated material even after washing and long exposure to the elements. When the material treated is normally soft and flexible, as is usually the case, then the flameproofing composition should also preserve these qualities.

For imparting flameproofing properties, certain organic water-insoluble compounds have been applied in solution in a volatile organic solvent. The cost of such compositions is an objection to their use as are also the inflammability and toxicity of certain of the more common solvents when used in a major proportion.

Inorganic salts and acids that are used in flameproofing are ordinarily freely soluble in water, easily washed from the treated product, and affected unfavorably even by fog and dew. Furthermore, the applications of inorganic salts tend to disintegrate and fall from the treated textile or the like.

I have now discovered a composition possessing advantages over not only the organic but also the inorganic fireproofing compositions heretofore used.

Briefly stated, the invention comprises an emulsion of a normally pliable incombustible organic binder material and an aqueous solution of a water-soluble fireretarding component, the aqueous solution being the dispersed phase in the emulsion and the originally dispersed particles of binder material being adapted, on application to a fabric, to undergo coalescence and form a continuous pliable film which isolates the soluble fireretarding component in the form of minute particles within the film, so that accessibility of water to the water-soluble component is eliminated.

The composition is adapted to be applied to cotton, wool, silk, other textiles, or leather, or the like, as by spraying, brushing or dipping. The treated fabric is allowed to dry either at ordinary or moderately elevated temperatures that are usual in the drying of fabrics. There results evaporation of the water present with the formation first of small droplets of concentrated solution of the fireretarding component and then minute solid particles of the component. There results also coalescence of the particles of binder material to give a continuous film that isolates and encloses the solid particles.

When a fabric so treated is exposed to temperatures that ordinarily would cause ignition, there is obtained the fireproofing effect of the incombustible material constituting the continuous film and also of the dispersed fireretarding component. If the organic material is decomposed by exposure to the high temperature, there still remains the effect of the inorganic component. Also, the inorganic component being, as stated later, suitably one that undergoes an endothermic change at high temperature, retards the decomposition of the organic binder. The result is a very satisfactory fireproofing effect. Furthermore, the pliability of the binder makes it possible to preserve substantially the original flexibility of the fabric. In addition, the film of binder material prevents the fireretarding component from being removed, either by mechanical abrasion or by water.

The binder used should be a material that is water-insoluble, incombustible, normally pliable in film form, and adapted, either alone or after solution in a volatile organic solvent, to form with an aqueous solution of the fireretarding component an emulsion in which the binder material constitutes the external, continuous phase.

Among binder materials that meet these general requirements and that are particularly satisfactory for use in my flameproofing emulsion are the following: Chlorinated rubber, chlororubber, neoprene, chlorinated naphthalene (Halowax), polychlor diphenyl such as Arochlor, and incombustible pliable rubbery chlorine derivatives of hydrocarbons in general. Examples of such commercial chlorine-containing hydrocarbons that may be used are Parlon, Pliofilm, and Koroseal. These materials are known to be permanently pliable. In place of the chlorine compounds described, there may be used the corresponding bromine or iodine compounds provided they are pliable.

The binder material suitably includes not only one or more of the incombustible organic compounds described but also a plasticizer or flexibilizer for the selected material. The plasticizer selected should be incombustible in the proportion used, substantially non-volatile, and miscible with the binder material. Among such plasticizers that may be used are tricresyl phosphate, triphenyl phosphate, chlorinated mineral oil, and liquid polychlor derivatives of diphenyl, either alone or in mixture with each other.

When it is necessary to reduce the viscosity or modify the consistency of a binder material that alone is too viscous or stiffly plastic in such manner as to promote ease of emulsification with an aqueous solution, convenience of application, and penetration into the surface portions of a porous material to be flameproofed, there is used a solvent for the binder material and plasticizer.

The solvent used should be one that is insoluble in water, readily volatile and adapted to dissolve the binder and plasticizer. Among such solvents that are satisfactory are toluene, xylene, cleaners naphtha, and V. M. & P. naphtha.

The fireretarding component is an inorganic compound or mixture of inorganic compounds that are non-injurious to the fabrics to which the flameproofing emulsion is to be applied and that, on exposure to elevated temperatures, undergo an endothermic change and develop a fireretarding barrier, as by generating an incombustible gas that is not a supporter of combustion or by forming a fused mass of incombustible material. Among the compounds that meet these general requirements and that illustrate the chemicals that may be used for this purpose are the following: Diammonium phosphate, ammonium phosphate, sodium borophosphate, and monoammonium phosphate.. These compounds on moderate heating either fuse or develop ammonia, both changes being endothermic and of cooling effect upon the flameproofing composition.

To promote emulsification of the two immiscible phases, the one containing the binder material and the other the aqueous solution of the fireretarding component, there is used to advantage a conventional emulsifying agent of kind known to emulsify water or aqueous solutions with compounds that are predominantly hydrocarbon in composition and in about the proportion that is usual for the selected emulsifier. Thus, there may be used sulfonated castor oil or two materials such as ammonium linoleate, another alkali metal soap, or a sodium alkyl sulfonate with a water-soluble amine such as, for example, triethylenetetramine.

The proportions of the several materials to be used are not critical; the proportions being adjusted to obtain a high percentage of the fireretarding component and sufficient binder material to form a continuous layer that will hold the fireretarding component in a pliable film on the treated material.

The proportion of plasticizer to be used will vary somewhat with the effectiveness per unit of mass of the plasticizer selected and should be an amount adequate to make the film non-rigid but less than the amount which if used would make the film tacky.

Of the fireretarding component there is used to advantage about as much as possible of the material without having an excess that would interfere with the stated desired properties of the finished film. Thus, there is used fireretarding component preferably in or less than the proportion required to saturate originally the aqueous phase in the emulsion. There may be used, for example, about 10 to 30 parts for 100 parts of the total emulsion, proportions here and elsewhere herein being stated as parts by weight.

Examples of the proportions that are satisfactory as well as ranges that have been found to be particularly effective in practical usage are shown in the following table.

| Ingredient | Range of proportions | |
|---|---|---|
| | Satisfactory | Preferred |
| Binder material | 7 to 30 | 10 to 15 |
| Volatile organic solvent | 20 to 40 | 25 to 35 |
| Fireretarding component | 10 to 30 | 15 to 20 |
| Plasticizer | 1.5 to 5 | 2.5 to 4 |
| Emulsifier | 0.5 to 10 | 1 to 7 |
| Water to make total | 100 | 100 |

It will be understood that the plasticizer may be omitted entirely when the binder material is itself sufficiently flexible and soft and remains so indefinitely when in the frm of a film. Also, the emulsifier may be omitted in case the other materials emulsify readily without the addition of a special added emulsifier.

In making flameproofing compositions the ingredients that form solutions with each other are preferably mixed separately and the resulting solutions then are emulsified with each other. Thus, the water-soluble fireretarding components are dissolved in the water, the binder material, plasticizer if used, and organic solvent are formed into a solution, and the former solution then emulsified with the latter, by slowly introducing the former into the latter, under the influence of high speed, vigorous agitation. The emulsifier is made part of one of the separate solutions or is added at the time of starting the emulsification of the two solutions with each other. Water-in-oil emulsions are formed. Such emulsions when applied in the form of a film to materials to be flameproofed dry rapidly and leave the water-soluble component enclosed in a waterproof envelope of the water-insoluble binder.

The invention will be illustrated further by description in connection with the following specific examples of compositions that are effective for the purpose.

*Example I*

| | |
|---|---|
| Parlon (chlorinated rubber) | 15 |
| Tricresyl phosphate | 3.75 |
| Toluene | 31.25 |
| Water | 32 |
| Mixture of ammonium phosphates and ammonium sulfate | 16 |
| Special sulfonated castor oil | 2 |

*Example II*

| | |
|---|---|
| Koroseal (plasticized vinyl chloride) | 15 |
| Tricresyl phosphate | 3.75 |
| Toluene | 31.25 |
| Water | 28 |
| Abopon (sodium borophosphate complex) | 20 |
| Sulfonated castor oil | 2 |

*Example III*

| | |
|---|---|
| Parlon (chlorinated rubber) | 10 |
| Tricresyl phosphate | 2.5 |
| Toluene | 17.5 |
| Water | 43 |
| Mixture of ammonium phosphates and ammonium sulfate | 20 |
| Emulsifier B 585 (ammonium linoleate) | 2 |
| Sulfatate (sodium petroleum fraction sulfonate) | 3 |
| Triethylenetetramine | 2 |

In the case of Example III, the order of mixing is reversed, the organic solution of the first three ingredients being added slowly, with vigorous stirring, to the solution of the remaining ingredients.

The terms "flameproof" and "fireproof" are used herein in the same sense, to mean burning either very slowly or not at all when exposed in air directly to a flame.

It will be understood that certain details have been given for the purpose of illustration and that variations within the spirit of the invention may be made without departing from the scope of the invention.

What I claim is:

1. A flameproofing emulsion comprising a solution of coalescable, permanently pliable, water-insoluble, incombustible halogen substituted hydrocarbon serving as organic binder material in a volatile organic solvent therefor and an aqueous solution of a water-soluble inorganic fireretarding component, the aqueous solution being the dispersed phase and the emulsion, on application to a material to be flameproofed providing a continuous pliable film of coalesced particles of the binder material including interiorily isolated minute particles of the soluble fireretarding component and restricting access of water to the said component on exposure of the flameproofed material to water.

2. A flameproofing emulsion comprising a water-dispersible emulsifying agent, a binder material including a major proportion of a rubbery chlorine substituted hydrocarbon material, and an aqueous solution of a water-soluble inorganic fireretarding component, the aqueous solution being the dispersed phase and the emulsion on application to a material to be flameproofed providing a continuous pliable film of coalesced particles of the binder material including interiorly isolated minute particles of the soluble fireretarding component and restricting access of water to the said component on exposure of the flameproofed material to water.

3. A flameproofing composition as described in claim 2, including a minor proportion of a water-insoluble plasticizer for the said rubbery material.

4. A flameproofing composition as described in claim 1, the proportions of the several ingredients of the emulsion being about as follows: binder material 7 to 30 parts, fireretarding component 10 to 30 parts, and organic solvent and water together in amount to make 100 parts total of the said composition.

5. A flameproofing composition comprising coalescable, permanently pliable, water-insoluble, incombustible halogen substituted hydrocarbon serving as organic binder material, a volatile organic solvent therefor in which the binder material is dissolved to form a solution, an aqueous solution of a water-soluble fire retarding metal phosphate, and an emulsifying agent, the two solutions being emulsified with each other, the aqueous solution being the dispersed phase in the emulsion, and the emulsion on application to a material to be flameproofed providing a continuous pliable film of coalesced particles of the binder material including interiorly isolated minute particles of the soluble fire retarding phosphate and restricting access of water to the said phosphate on exposure of the flameproofed material to water.

6. A flameproofing composition as described in claim 5, the proportions of the several ingredients being as follows: binder material, 7 to 30 parts; volatile organic solvent, 20 to 40 parts; and the aqueous solution of the fire retarding phosphate, 30 to 73 parts.

HARRY BENNETT.